(12) United States Patent
Kawakita et al.

(10) Patent No.: US 9,042,939 B2
(45) Date of Patent: May 26, 2015

(54) PORTABLE ELECTRONIC DEVICE AND CONTROL METHOD

(71) Applicant: KYOCERA Corporation, Kyoto (JP)

(72) Inventors: Masaya Kawakita, Kyoto (JP); Daisuke Mori, Kyoto (JP)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 13/679,743

(22) Filed: Nov. 16, 2012

(65) Prior Publication Data
US 2013/0130739 A1    May 23, 2013

(30) Foreign Application Priority Data
Nov. 18, 2011 (JP) ................................. 2011-252931

(51) Int. Cl.
*H04M 1/00* (2006.01)
*H04W 88/06* (2009.01)
(Continued)

(52) U.S. Cl.
CPC ............ *H04W 88/06* (2013.01); *H04W 76/026* (2013.01); *H04W 36/14* (2013.01); *H04W 48/18* (2013.01); *H04W 36/0022* (2013.01); *H04W 76/028* (2013.01)

(58) Field of Classification Search
CPC ... H04W 88/06; H04W 48/18; H04W 76/026; H04W 36/0022; H04W 24/02; H04W 36/14; H04W 72/1215; H04W 36/0088; H04W 76/028
USPC ............... 455/552.1, 553.1, 432, 1, 433, 436, 455/437, 444, 448, 449, 550.1; 370/319–322, 328–338
See application file for complete search history.

(56) References Cited

U.S. PATENT DOCUMENTS 6,801,777 B2 * 10/2004 Rusch .......................... 455/452.2
8,780,867 B2 * 7/2014 Chin et al. ..................... 370/332
(Continued)

FOREIGN PATENT DOCUMENTS

JP    2005-073078    3/2005
JP    2010-245825    10/2010
(Continued)

OTHER PUBLICATIONS

Notice of Reasons for Rejection issued to JP Application No. 2011-252931, mailed Jan. 20, 2015.

*Primary Examiner* — Olumide T Ajibade Akonai
(74) *Attorney, Agent, or Firm* — Hoffmann & Baron, LLP

(57) ABSTRACT

A portable electronic device and a method of controlling are disclosed, each of which is capable of efficiently selecting a communication processing unit. The portable electronic device includes: a first communication processing unit conforming to a first communication scheme; a second communication processing unit conforming to a second communication scheme; a third communication processing unit conforming to a third communication scheme; and a control unit. When data communication is performed, the control unit controls each processing unit so as to preferentially use the first communication processing unit, the second communication processing unit, and the third communication processing unit in this order. In a case in which a network is disconnected while data communication is being performed by the second communication processing unit, the control unit executes control so as to continue the data communication by the third communication processing unit.

5 Claims, 8 Drawing Sheets

(51) Int. Cl.
*H04W 76/02* (2009.01)
*H04W 36/14* (2009.01)
*H04W 48/18* (2009.01)
*H04W 36/00* (2009.01)

(56) References Cited

U.S. PATENT DOCUMENTS

2008/0113692 A1* 5/2008 Zhao et al. .................... 455/574
2011/0151924 A1* 6/2011 Miller ......................... 455/552.1
2011/0188451 A1* 8/2011 Song et al. .................... 370/328

FOREIGN PATENT DOCUMENTS

| JP | 2010-245941 | 10/2010 |
| JP | 2011-188395 | 9/2011 |
| WO | 2007/099700 A1 | 9/2007 |
| WO | 2008/063993 A1 | 5/2008 |

* cited by examiner

FIG. 6

| COMMUNICATION SCHEME | USABLE FREQUENCY | MAXIMUM TRANSFER RATE (Mbit/s) | | MAXIMUM COMMUNICATION DISTANCE (km) |
|---|---|---|---|---|
| | | DOWNLOAD | UPLOAD | |
| IEEE802.11 | 2.4GHz/5GHz | 54 (a,g), 11(b),600(n) | | ~0.1 |
| IEEE802.16 | 11GHz OR LESS | 75 (20 MHz WIDTH/HOUR) | | 2 |
| CDMA2000 1xEV-DO Rev.A | 800MHz/2GHz | 3.1 | 1.8 | 10 |

PORTABLE ELECTRONIC DEVICE AND CONTROL METHOD

This application is based on and claims the benefit of priority from Japanese Patent Application No. 2011-252931, filed on 18 Nov. 2011, the content of which is incorporated herein by reference.

BACKGROUND OF THE INVENTION

1. Field of the Invention

The present invention relates to a portable electronic device having a plurality of communication processing units, and to a control method of controlling the device.

2. Related Art

Recent portable electronic devices have a function capable of conforming to a plurality of radio bearers. For example, PCT International Publication, No. WO 2007/099700 discloses a technique of selecting an optimum radio bearer in consideration of application characteristics for each application, when establishing a network by using any one of a plurality of radio bearers.

SUMMARY OF THE INVENTION

Incidentally, in a state where a plurality of radio bearers is available, a priority rule for preferentially using the radio bearers is established in a portable electronic device in general.

Here, descriptions are provided by assuming a lost state arising from an authentication error that occurs by changing a password or the like, when data communication is being performed by using a high-level radio bearer (more specifically, a state where the high-level radio bearer can confirm an AP (access point)).

The portable electronic device continues the data communication by switching over from the high-level radio bearer in the lost state to a middle-level radio bearer. Subsequently, in a case in which the middle-level radio bearer is also lost, the portable electronic device attempts to establish a network with the high-level radio bearer in accordance with the priority rule. Since the portable electronic device can confirm the AP conforming to the high-level radio bearer, the portable electronic device makes a network connection request to this AP. In this case, when an AP authentication error occurs, and the portable electronic device cannot confirm an AP conforming to another high-level radio bearer, the portable electronic device performs data communication by using a low-level bearer.

In other words, in a case in which the high-level radio bearer is lost due to an authentication error, the portable electronic device switches over to the middle-level radio bearer, and the middle-level radio bearer is also lost thereafter, the portable electronic device attempts to switch over to the high-level radio bearer again in accordance with the priority rule. In this case, it is highly possible for an authentication error to occur to the high-level radio bearer. In this manner, the portable electronic device wastes time and processing.

An object of the present invention is to provide a portable electronic device and a control method, all of which are capable of suppressing waste of time and processing, and efficiently selecting a communication processing unit.

In order to solve the above problems, the portable electronic device according to the present invention includes: a first communication processing unit conforming to a first communication scheme; a second communication processing unit conforming to a second communication scheme; a third communication processing unit conforming to a third communication scheme; and a control unit. When data communication is performed, the control unit controls each processing unit so as to preferentially use the first communication processing unit, the second communication processing unit, and the third communication processing unit in this order. In a case in which a network is disconnected while data communication is being performed by the second communication processing unit, the control unit executes control so as to continue the data communication by the third communication processing unit.

In the portable electronic device, the first communication scheme may be a communication scheme conforming to IEEE 802.11, the second communication scheme may be a communication scheme conforming to IEEE 802.16, and the third communication scheme may be a communication scheme conforming to an IMT-2000 standard.

The portable electronic device may be configured such that, in a case in which the network is disconnected while data communication is being performed by the first communication processing unit, the control unit determines whether the data communication can be continued by using the second communication processing unit; and in a case in which the control unit determines that the data communication can be continued by using the second communication processing unit, the data communication is continued by using the second communication processing unit, and the control unit determines, in a predetermined cycle, whether data communication can be performed by the first communication processing unit.

The portable electronic device may be configured such that, in a state where the data communication is continued by using the second communication processing unit, in a case in which the control unit determines that data communication can be performed by the first communication processing unit, the control unit executes control so as to continue the data communication by the first communication processing unit.

In order to solve the above problems, the control method according to the present invention is a method of controlling each control unit for data communication in an order of preferentially using a first communication processing unit conforming to a first communication scheme, a second communication processing unit conforming to a second communication scheme, and a third communication processing unit conforming to a third communication scheme. The method includes a connection step, and in a case in which a network is disconnected while data communication is being performed by the second communication processing unit, the control unit executes control so as to continue the data communication by the third communication processing unit.

According to the present invention, it is possible to efficiently select a communication processing unit.

BRIEF DESCRIPTION OF THE DRAWINGS

FIG. 6 is a table for illustrating usable frequency, a maximum transfer rate, and a maximum communication distance, in each communication scheme;

DETAILED DESCRIPTION OF THE INVENTION

An embodiment for carrying out the present invention is described in detail with reference to the drawings. A smartphone is hereinafter described as an example of a device including a touch-screen display.

Embodiment

Figure 1:
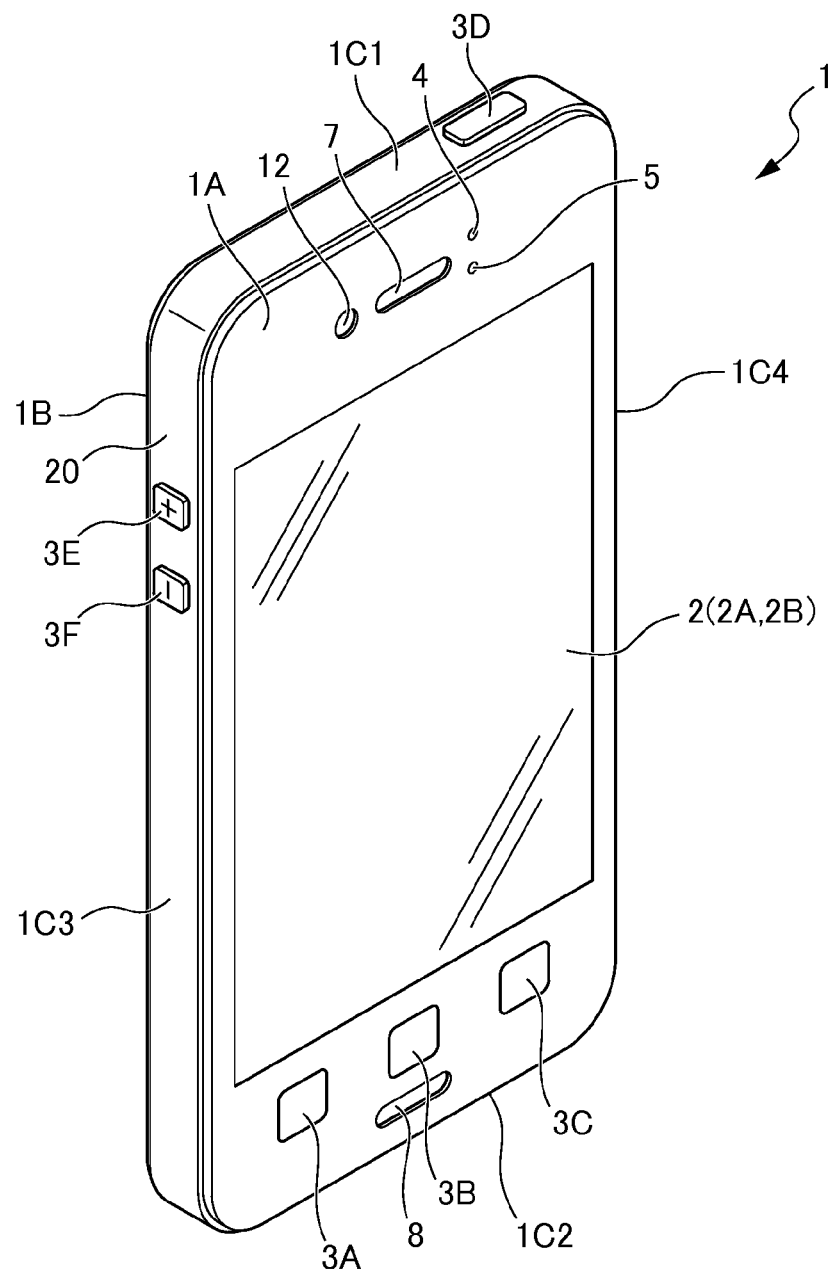
FIG. 1 is a perspective view showing an external appearance of a smartphone according to an embodiment.
Figure 2:
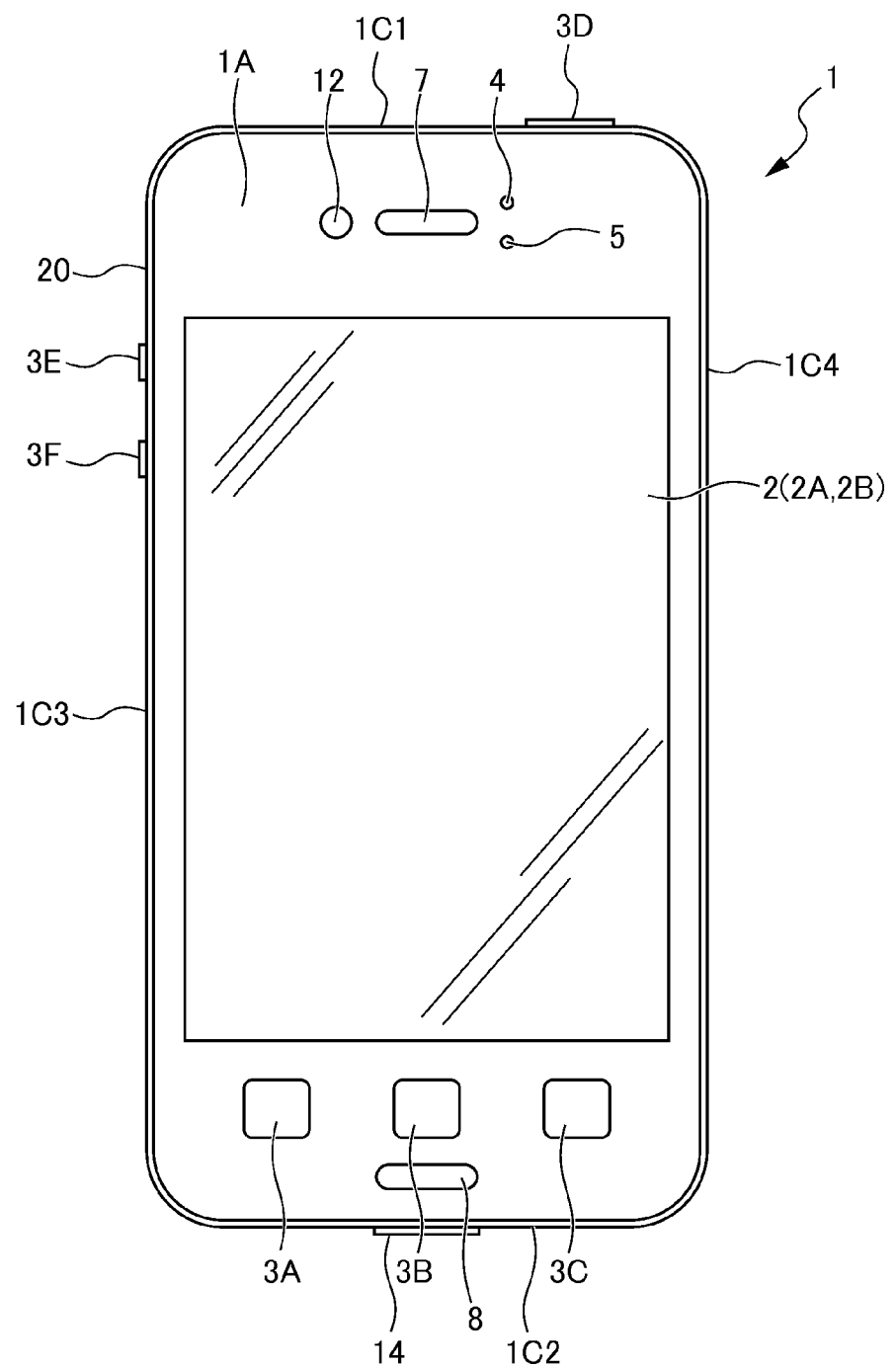
FIG. 2 is a front view showing the external appearance of the smartphone according to the embodiment.
Figure 3:
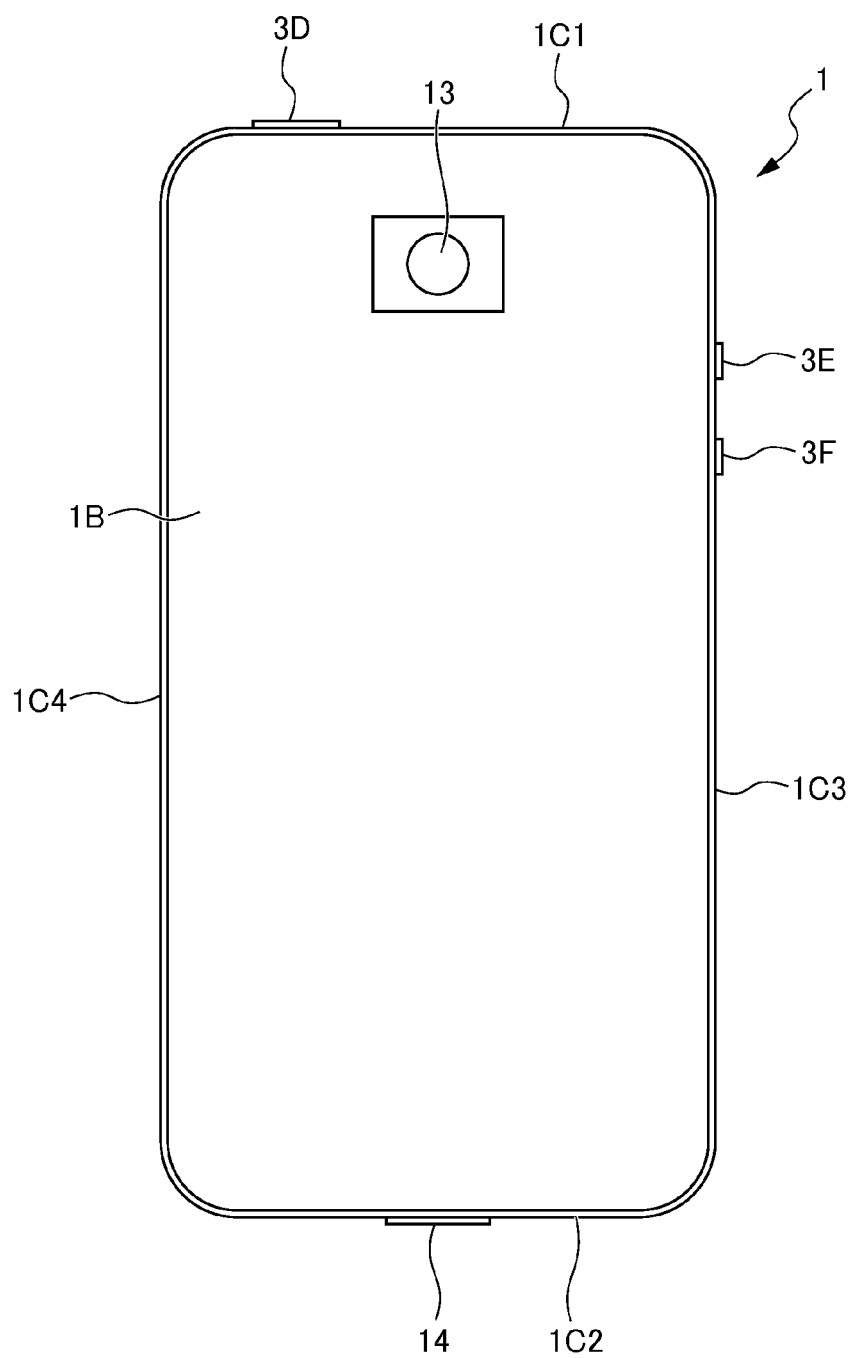
FIG. 3 is rear view showing the external appearance of the smartphone according to the embodiment.

Descriptions are provided for an external appearance of a smartphone 1 according to the embodiment with reference to FIGS. 1 to 3. As shown in FIGS. 1 to 3, the smartphone 1 has a housing 20. The housing 20 has a front face 1A, a back face 1B, and side faces 1C1 to 1C4. The front face 1A is a front face of the housing 20. The back face 1B is a back face of the housing 20. The side faces 1C1 to 1C4 are side faces that connect the front face 1A and the back face 1B. In the following descriptions, the side faces 1C1 to 1C4 may be collectively referred to as a side face 1C without specifying which face.

On the front face 1A, the smartphone 1 has a touch-screen display 2, buttons 3A to 3C, an illuminance sensor 4, a proximity sensor 5, a receiver 7, a microphone 8, and a camera 12. The smartphone 1 has a camera 13 in the back face 1B. The smartphone 1 has buttons 3D to 3F and an external interface 14 in the side face 1C. In the following descriptions, the buttons 3A to 3F may be collectively referred to as a button 3 without specifying which button.

The touch-screen display 2 has a display 2A and a touch screen 2B. The display 2A includes a display device such as a liquid crystal display, an organic electro-luminescence panel, or an inorganic electro-luminescence panel. The display 2A displays characters, images, symbols, graphics or the like.

The touch screen 2B detects a touch by a finger, a stylus pen or the like to the touch-screen display 2. The touch screen 2B detects a position where a plurality of fingers, the stylus pen or the like touch the touch-screen display 2.

A detection method for the touch screen 2B may be any method such as a capacitive sensing method, a resistor film method, a surface acoustic wave method (or an ultrasonic sensing method), an infrared ray method, and an electromagnetic induction method. In the following, for the purpose of simplifying descriptions, the fingers, the stylus pen or the like may be simply referred to as a "finger", a touch by which to the touch-screen display 2 is detected by the touch screen 2B.

The smartphone 1 distinguishes a type of a gesture, based on a touch(s), a touched position(s), a touching period of time, or a touching number of times, detected by the touch screen 2B. The gesture is an operation that is performed on the touch-screen display 2. Gestures that are distinguished by the smartphone 1 include a touch, a long touch, a release, a swipe, a tap, a double tap, a long tap, a drag, a flick, a pinch-in, a pinch-out, and the like.

The touch is a gesture of a finger to touch the touch-screen display 2 (for example, to a surface thereof). The smartphone 1 distinguishes the gesture of a finger touching the touch-screen display 2 as a touch. The long touch is a gesture of a finger touching the touch-screen display 2 for more than a certain period of time. The smartphone 1 distinguishes the gesture of a finger touching the touch-screen display 2 for more than a certain period of time as a long touch.

The release is a gesture of a finger being released from the touch-screen display 2. The smartphone 1 distinguishes the gesture of a finger being released from the touch-screen display 2 as a release. The swipe is a gesture of a finger moving while touching the touch-screen display 2. The smartphone 1 distinguishes the gesture of a finger moving while touching the touch-screen display 2 as a swipe.

The tap is a consecutive gesture of touch and release. The smartphone 1 distinguishes the consecutive gesture of touch and release as a tap. The double tap is a gesture of repeating a consecutive gesture of touch and release two times. The smartphone 1 distinguishes the gesture of repeating a consecutive gesture of touch and release two times as a double tap.

The long tap is a consecutive gesture of a long touch and release. The smartphone 1 distinguishes the consecutive gesture of a long touch and release as a long tap. The drag is a gesture of swiping from a starting point where a movable object is displayed. The smartphone 1 distinguishes the gesture of swiping from a starting point where a movable object is displayed as a drag.

The flick is a consecutive gesture of touch and release of a finger moving at a high-speed in one direction. The smartphone 1 distinguishes the gesture of touch and release of a finger moving at a high-speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; and the like.

The pinch-in is a gesture of a plurality of fingers swiping in mutually approaching directions. The smartphone 1 distinguishes the gesture of a plurality of fingers swiping in mutually approaching directions as a pinch-in. The pinch-out is a gesture of a plurality of fingers swiping in mutually receding directions. The smartphone 1 distinguishes the gesture of a plurality of fingers swiping in mutually receding directions as a pinch-out.

The smartphone 1 is operated in accordance with these gestures that are distinguished via the touch screen 2B. Therefore, intuitive and easy-to-use operability is achieved for a user. An operation, which is performed by the smartphone 1 in accordance with a gesture thus distinguished, is different depending on a screen that is displayed on the touch-screen display 2.

Figure 4:
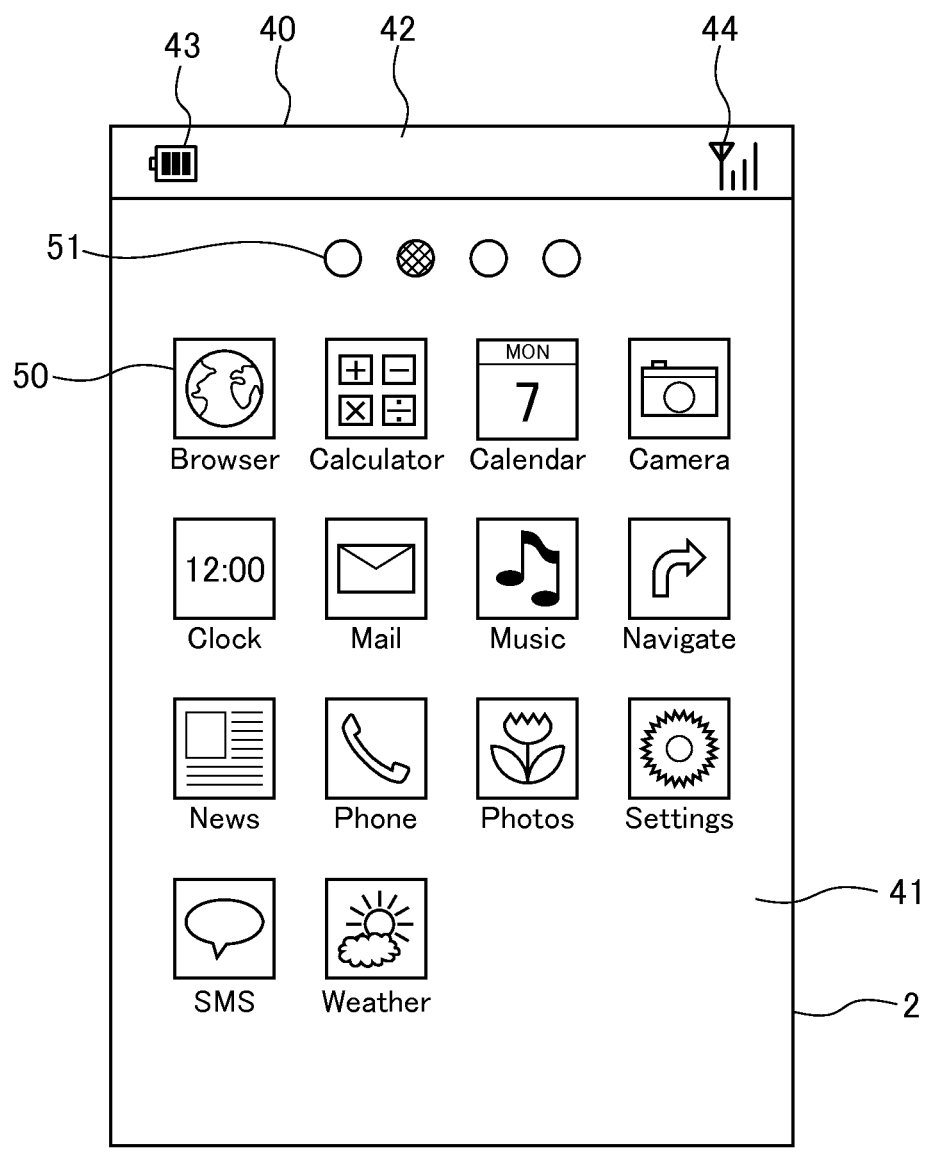
FIG. 4 is a diagram showing an example of a home screen.

An example of a screen displayed on the display 2A is described with reference to FIG. 4. FIG. 4 shows an example of a home screen. The home screen may be called a desktop or an idle screen. The home screen is displayed on the display 2A. The home screen is a screen for allowing the user to select which application to be executed among applications installed in the smartphone 1. When an application is selected in the home screen, the smartphone 1 executes the application in the foreground. The screen of the application executed in the foreground is displayed on the display 2A.

The smartphone 1 can arrange icons in the home screen. A plurality of icon 50 is arranged in the home screen 40 shown in FIG. 4.

The icon 50 is previously associated with the applications installed in the smartphone 1, respectively. When the smartphone 1 detects a gesture on an icon 50, an application associated with the icon 50 is executed. For example, when the smartphone 1 detects a tap on an icon 50 associated with a mail application, the mail application is executed. Here, for example, the smartphone 1 interprets the gesture on a position (area), which corresponds to a display position (area) of the icon 50 on the touch-screen display 2, as an instruction to execute an application associated with the icon 50.

The icon 50 includes an image and a character string. The icon 50 may include a symbol or graphics in place of the image. The icon 50 may not include any one of the image or the character string. The icon 50 is arranged in accordance with a predetermined rule. A wall paper 41 is displayed behind the icon 50. The wall paper may also be called a photo screen or a back screen. The smartphone 1 can use an arbitrary image as the wall paper 41. An arbitrary image is determined as the wall paper 41, for example, in accordance with the setting by the user.

The smartphone 1 can increase and decrease the number of home screens. The smartphone 1 determines the number of home screens, for example, in accordance with the setting by the user. Even in a case in which there is a plurality of home screens, the smartphone 1 selects a single home screen from the plurality of home screens, and displays the single home screen on the display 2A.

The smartphone 1 displays one or more locators on the home screen. The number of the locators coincides with the number of the home screens. The locator indicates the position of the currently displayed home screen. The locator corresponding to the currently displayed home screen is displayed in a manner different from the other locators.

Four locators 51 are displayed in the example shown in FIG. 4. This indicates that there are four home screens 40. In the example shown in FIG. 4, the second symbol (locator) from the left is displayed in a manner different from the other symbols (locators). This indicates that the second home screen from the left is currently displayed.

When the smartphone 1 detects a particular gesture while displaying the home screen, the home screen displayed on the display 2A is switched. For example, when the smartphone 1 detects a rightward flick, the home screen displayed on the display 2A is switched over to a next home screen to the left. When the smartphone 1 detects a leftward flick, the home screen displayed on the display 2A is switched over to a next home screen to the right.

An area 42 is provided at the top edge of the display 2A. A remaining-level mark 43 indicating a remaining level of the rechargeable battery, and a radio wave level mark 44 indicating field intensity of radio waves for communication are displayed in the area 42. In the area 42, the smartphone 1 may display current time, weather information, active applications, a type of communication system, a telephone status, a device mode, events occurred to the device, etc. In this way, the area 42 is used for making various notifications to the user. The area 42 may be provided as another screen separate from the home screen 40. The position of providing the area 42 is not limited to the top edge of the display 2A.

The home screen 40 shown in FIG. 4 is an example, and shapes of various elements, layouts of various elements, the number of home screens 40, and the manner of various operations on the home screen 40 may not be as described in the above descriptions.

Figure 5:
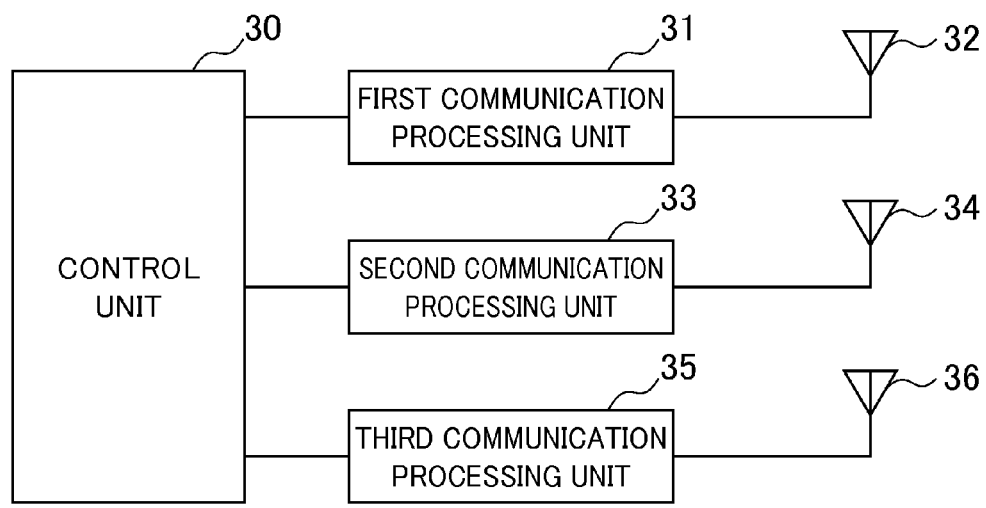
FIG. 5 is a block diagram showing functions of the smartphone according to the embodiment.

FIG. 5 is a block diagram showing a configuration of the smartphone 1. The smartphone 1 includes a control unit 30, a first communication processing unit 31, a first antenna unit 32, a second communication processing unit 33, a second antenna unit 34, a third communication processing unit 35, and a third antenna unit 36. In addition to the constituent elements described above, the smartphone 1 includes other constituent elements such as a microphone.

The first communication processing unit 31 conforms to a first communication scheme. The second communication processing unit 33 conforms to a second communication scheme. The third communication processing unit 35 conforms to a third communication scheme. In the following, the communication by the first communication processing unit 31 is also called high-level bearer communication, since the priority of the communication by the first communication processing unit 31 is set higher than the priority of the communication by the second communication processing unit 33 and the third communication processing unit 35. The communication by the second communication processing unit 33 is also called middle-level bearer communication, since the priority thereof is set higher than the priority of the communication by the third communication processing unit 35. The communication by the third communication processing unit 35 is also called low-level bearer communication.

When data communication is performed, the control unit 30 controls each processing unit so as to preferentially use the first communication processing unit 31, the second communication processing unit 33, and the third communication processing unit 35 in this order. In other words, in a case in which all of the first communication processing unit 31, the second communication processing unit 33 and the third communication processing unit 35 are available, the control unit 30 preferentially uses the first communication processing unit 31 to perform data communication. In a case in which data communication cannot be performed by the first communication processing unit 31, the control unit 30 preferentially uses the second communication processing unit 33 to perform data communication.

In a case in which the network is disconnected due to an authentication error occurring by changing a password or the like while data communication is being performed by the second communication processing unit 33, the control unit 30 uses the third communication processing unit 35 to continue the data communication.

Here, in a case in which the network is disconnected while the data communication is being performed by using the second communication processing unit 33, even if data communication is attempted to be performed by using the first communication processing unit 31 according to the priority order of use, the first communication processing unit 31 is considered to be unavailable in many cases. In other words, the data communication is currently performed by the second communication processing unit 33 because the data communication cannot be performed by the first communication processing unit 31.

The third communication processing unit 35 is always performing intermittent reception under a predetermined condition, and can enter an active state anytime (a state where data communication can be performed). The predetermined condition refers to having sufficient field intensity or the like for enabling data communication to be performed.

In this way, the smartphone 1 can suppress waste of time and processing, and can efficiently select a connectable communication processing unit.

Although the configuration and operations of the smartphone 1 have been described above, the smartphone 1 is not limited thereto, and may include each constituent element configured as a control method and a control program for suppressing waste of time and processing, and for efficiently selecting a communication processing unit.

In a case in which connection is already established by the first communication processing unit 31, connection by the third communication processing unit 35 is not necessary in view of the priority order; therefore, the smartphone 1 may be configured to check whether the first communication processing unit 31 is connected.

In a case in which the third communication processing unit 35 is disabled or is out of service, it is useless to make a connection request for the third communication processing unit 35; therefore, the smartphone 1 may be configured to operate as follows. On condition that the setting of the third communication processing unit 35 is enabled, and that the smartphone 1 is within a communication range, the smartphone 1 may be configured to use the third communication processing unit 35 to continue the data communication, in a case in which the network is disconnected due to an authentication error occurring by changing a password or the like while the data communication is being performed by the second communication processing unit 33.

The first communication scheme is, for example, a communication scheme conforming to IEEE 802.11 (wireless LAN). The second communication scheme is, for example, a communication scheme conforming to IEEE 802.16. The third communication scheme is, for example, a communication scheme conforming to the IMT-2000 standard (for example, CDMA2001xEV-DO_Rev.A).

FIG. 6 shows usable frequency, a maximum transfer rate, and a maximum communication distance, in each communication scheme. In a case in which the first communication processing unit 31 (for example, conforming to IEEE 802.11n) is used, the transfer rate is the highest; therefore, it is possible to implement high speed data communication.

In a case in which the second communication processing unit 33 is used, the communication distance is longer than that in the case of using the first communication processing unit 31, and the transfer rate is higher than that in the case of using the third communication processing unit 35; therefore, it is possible to implement high speed data communication in a wide area.

In a case in which the third communication processing unit 35 is used, the communication distance is the longest; therefore, it is possible to implement data communication in a wide area.

In a case in which the network is disconnected while data communication is being performed by the first communication processing unit 31, the control unit 30 determines whether the data communication can be continued by using the second communication processing unit 33. In a case in which the control unit 30 determines that the data communication can be continued by using the second communication processing unit 33, the data communication is continued by using the second communication processing unit 33, and the control unit 30 determines, in a predetermined cycle, whether data communication can be performed by using the first communication processing unit 31.

In a state where the data communication is continued by using the second communication processing unit 33, in a case in which the control unit 30 determines that data communication can be performed by using the first communication processing unit 31, the control unit 30 executes control such that the data communication by the second communication processing unit 33 is terminated, and the data communication is continued by the first communication processing unit 31.

Figure 7:
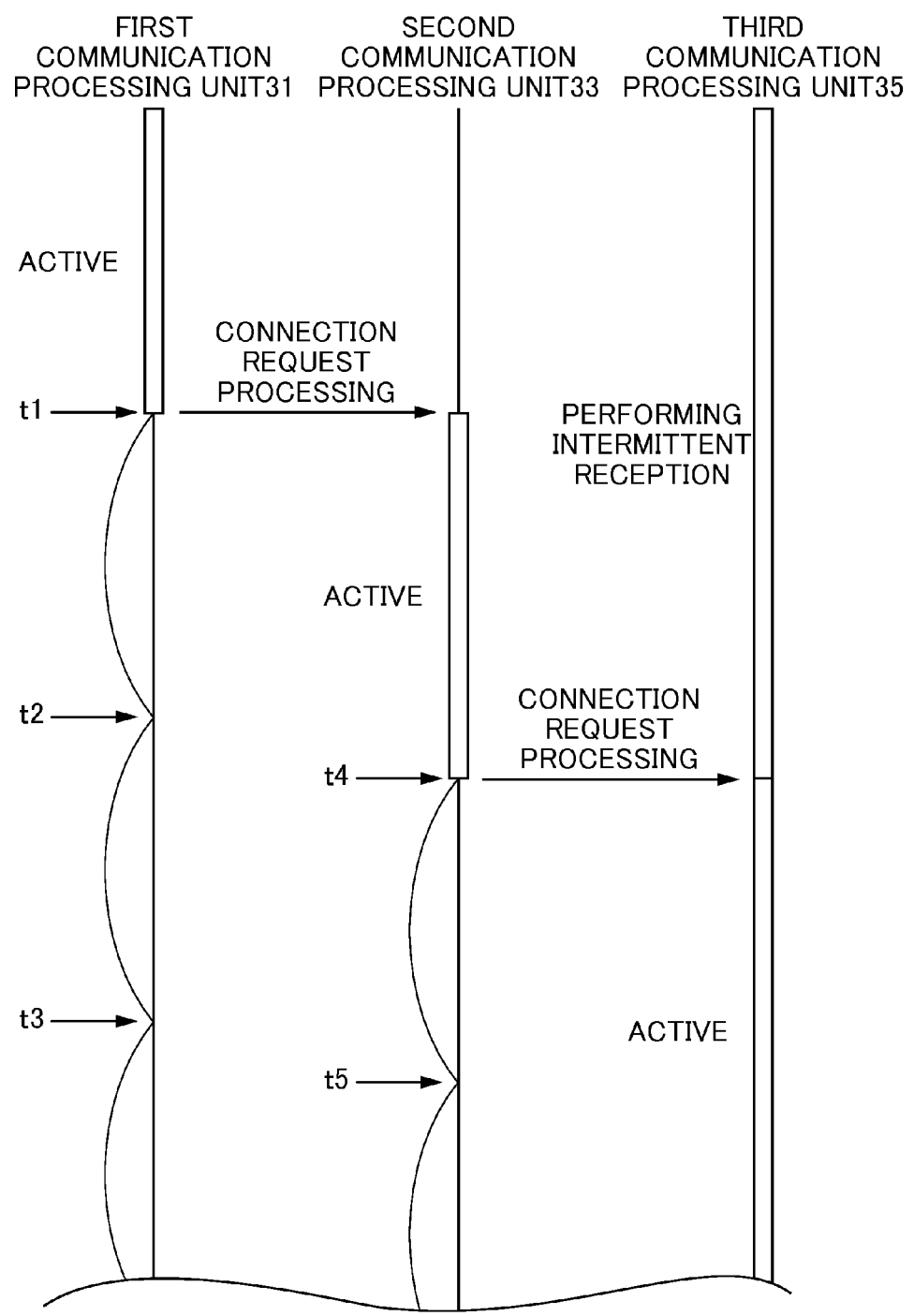
FIG. 7 is a diagram for illustrating timing of switching each communication processing unit.

More specifically, as shown in FIG. 7, in a case in which the network is disconnected while data communication is being performed by the first communication processing unit 31 (t1 in FIG. 7), the control unit 30 executes processing for establishing a network by using the second communication processing unit 33 (hereinafter referred to as connection request processing), and determines whether data communication can be performed. The connection request processing is a sequence of processing of: searching for a neighboring base station; executing authentication processing with the base station thus identified; and establishing a status in which data communication can be actually performed.

In a case in which data communication can be performed by the second communication processing unit 33 as a result of the connection request processing, the control unit 30 performs data communication by using the second communication processing unit 33. The control unit 30 executes connection request processing for the first communication processing unit 31 in a predetermined cycle. The predetermined cycle is, for example, the timing indicated by t2 and t3 shown in FIG. 7.

In a case in which the network is disconnected while data communication is being performed by the second communication processing unit 33 (t4 shown in FIG. 7), the control unit 30 performs data communication by the third communication processing unit 35. The third communication processing unit 35 is always performing intermittent reception under a predetermined condition, and can enter an active state anytime (a state where data communication can be performed).

The control unit 30 executes connection request processing for the second communication processing unit 33 in a predetermined cycle. The predetermined cycle is, for example, the timing indicated by t5 shown in FIG. 7.

In a case in which data communication can be performed by the first communication processing unit 31 as a result of the connection request processing, the control unit 30 executes processing of switching over to data communication by the first communication processing unit 31. As a result of the connection request processing, in a case in which data communication by the first communication processing unit 31 cannot be performed, but data communication by the second communication processing unit 33 can be performed, the control unit 30 executes control of switching over to data communication by the second communication processing unit 33.

Here, conventionally, in a case in which the network is disconnected while data communication is being performed by the second communication processing unit 33 (t4 shown in FIG. 7), connection request processing for the first communication processing unit 31 was executed at this disconnected timing. In this case, the first communication processing unit 31 is considered to be unavailable in many cases.

In this way, the smartphone 1 can suppress waste of time and processing, and can efficiently select a connectable communication processing unit.

Figure 8:
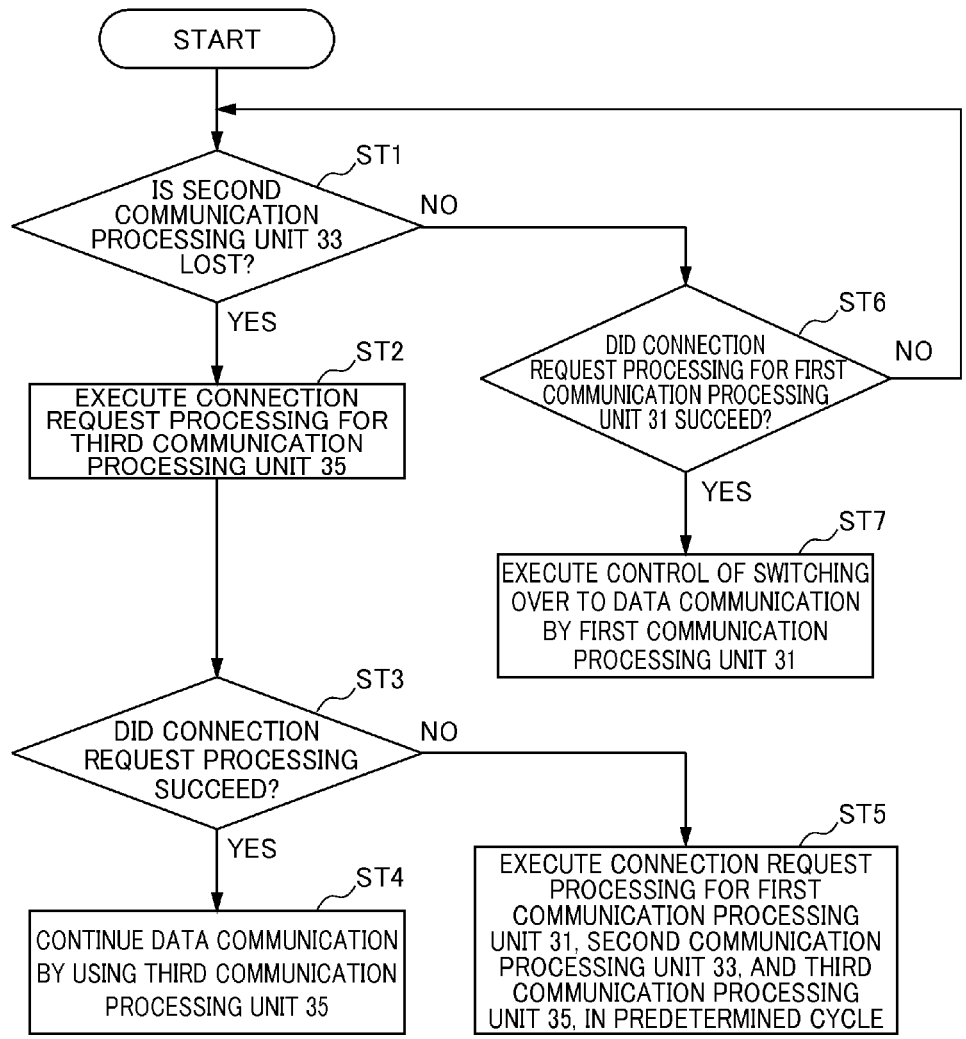
FIG. 8 is a flowchart for illustrating operations of switching each communication processing unit depending on a situation when performing data communication.

Next, with reference to a flowchart shown in FIG. 8, descriptions are provided for operations of switching each communication processing unit depending on a situation when the smartphone 1 performs data communication. In the following embodiment, descriptions are provided by assuming a state where data communication is being performed by the second communication processing unit 33. It is also assumed that the control unit 30 executes connection request processing for the first communication processing unit 31 in a predetermined cycle.

In Step ST1, the control unit 30 determines whether the network is disconnected (lost) due to an authentication error occurring by changing a password or the like while data communication is being performed by the second communication processing unit 33. In a case in which the network is lost (Yes), the processing advances to Step ST2; and in a case in which the network is not lost (No), the processing advances to Step ST6.

In Step ST2, the control unit 30 executes connection request processing for the third communication processing unit 35.

In Step ST3, the control unit 30 determines whether the connection request processing in Step ST2 succeeded. In a case in which the connection request processing succeeded (Yes), the processing advances to Step ST4; and in a case in which the connection request processing did not succeed (No), the processing advances to Step ST5.

In Step ST4, the control unit 30 continues the data communication by using the third communication processing unit 35. The control unit 30 executes connection request processing for the first communication processing unit 31 in a predetermined cycle.

In Step ST5, the control unit 30 executes connection request processing for the first communication processing unit 31, the second communication processing unit 33, and the third communication processing unit 35, in a predetermined cycle.

In Step ST6, the control unit 30 determines whether the connection request processing being executed in a predetermined cycle for the first executing communication processing unit 31 succeeded. In a case in which the connection request processing succeeded (Yes), the processing advances to Step ST7; and in a case in which the connection request processing did not succeed (No), the processing returns to Step ST1.

In Step ST7, the control unit 30 executes control of switching over from the data communication by the second communication processing unit 33 to data communication by the first communication processing unit 31.

In this way, the smartphone 1 can suppress waste of time and processing, and can efficiently select a connectable communication processing unit.

A characteristic embodiment has been described for the purpose of completely and clearly disclosing the present invention. However, the invention according to the attached claims should not be limited to the above embodiment, and the invention should be configured to embody all modifications and substitutable configurations that can be created by a person skilled in the art within the scope of the basic matter described herein.

In the above embodiment, the smartphone has been described as an example of a device including a touch-screen display, but the device according to the attached claims is not limited to a smartphone. For example, the device according to the attached claims may be a portable electronic device such as a mobile phone, a portable personal computer, a digital camera, a media player, an electronic book reader, a navigator or a gaming machine. The device according to the attached claims may be an electronic device of a standing type such as a desktop PC or a television receiver.

What is claimed is:

1. A portable electronic device, comprising:
   a first communication processing unit conforming to a first communication scheme;
   a second communication processing unit conforming to a second communication scheme;
   a third communication processing unit conforming to a third communication scheme; and
   a control unit, wherein, when data communication is performed, the control unit controls each processing unit so as to preferentially use the first communication processing unit, the second communication processing unit, and the third communication processing unit in this order, and
   wherein, in a case in which a network is disconnected while data communication is being performed by the second communication processing unit, the control unit executes control so as to continue the data communication by the third communication processing unit, and
   the third communication processing unit has already started to receive a signal before the data communication is disconnected by the second communication processing unit, and
   the second communication processing unit and the third communication processing unit are cellular communication systems,
   wherein, in a case in which the network is disconnected while data communication is being performed by the first communication processing unit, the control unit determines whether the data communication can be continued by using the second communication processing unit, and
   wherein, in a case in which the control unit determines that the data communication can be continued by using the second communication processing unit, the data communication is continued by using the second communication processing unit, and the control unit determines, in a predetermined cycle, whether data communication can be performed by the first communication processing unit.

2. The portable electronic device according to claim 1, wherein, in a state where the data communication is continued by using the second communication processing unit, in a case in which the control unit determines that data communication can be performed by the first communication processing unit, the control unit executes control so as to continue the data communication by the first communication processing unit.

3. The portable electronic device according to claim 1, wherein, in case that the control unit cannot perform the data communication by the third communication processing unit, the control unit tries to perform the data communication by the first communication processing unit.

4. A method of controlling each control unit for data communication in an order of preferentially using a first communication processing unit conforming to a first communication scheme, a second communication processing unit conforming to a second communication scheme, and a third communication processing unit conforming to a third communication scheme, the method comprising:
   a connection step, wherein, in a case in which a network is disconnected while data communication is being performed by the second communication processing unit, the control unit executes control so as to continue the data communication by the third communication processing unit, and
   the third communication processing unit has already started to receive a signal before the data communication is disconnected by the second communication processing unit, and
   the second communication processing unit and the third communication processing unit are cellular communication systems,
   wherein, in a case in which the network is disconnected while data communication is being performed by the first communication processing unit, the control unit determines whether the data communication can be continued by using the second communication processing unit, and
   wherein, in a case in which the control unit determines that the data communication can be continued by using the second communication processing unit, the data communication is continued by using the second communication processing unit, and the control unit determines, in a predetermined cycle, whether data communication can be performed by the first communication processing unit.

5. A portable electronic device, comprising:
a first communication processing unit conforming to a first communication scheme;
a second communication processing unit conforming to a second communication scheme;
a control unit, wherein, in a case in which the network is disconnected while data communication is being performed by the first communication processing unit, the control unit determines whether the data communication can be continued by using the second communication processing unit, and
wherein, in a case in which the control unit determines that the data communication can be continued by using the second communication processing unit, the data communication is continued by using the second communication processing unit, and the control unit determines, in a predetermined cycle, whether data communication can be performed by the first communication processing unit.

\* \* \* \* \*